Oct. 15, 1963 E. S. ROGERS, JR 3,107,277

ELECTRICAL DEVICES

Filed July 5, 1960 3 Sheets-Sheet 1

INVENTOR.
EDWARD S. ROGERS, JR.
BY Morris Rabkin
ATTORNEY

ELECTRICAL DEVICES

Filed July 5, 1960

INVENTOR.
EDWARD S. ROGERS, JR.
BY Morris L. Rabkin
ATTORNEY

ELECTRICAL DEVICES

Filed July 5, 1960 3 Sheets-Sheet 3

INVENTOR.
EDWARD S. ROGERS, JR.
BY Morris [signature]
ATTORNEY

United States Patent Office 3,107,277

Patented Oct. 15, 1963

3,107,277

ELECTRICAL DEVICES

Edward S. Rogers, Jr., Yardley, Pa., assignor to Radio Corporation of America, a corporation of Delaware Filed July 5, 1960, Ser. No. 40,769

31 Claims. (Cl. 179—1)

The present invention relates to electrical devices, and more particularly to electrical devices including solid state active components.

The invention is especially suitable for providing microphones, phonograph record pickups, pressure guages and other devices in the class of electromechanical transducers and motion responsive devices.

Although microphones and other electromechanical transducers and motion responsive devices utilizing solid state active components (e.g., transistors, semiconductor diodes, and bars of semiconductive material) have been proposed in the past, such devices have presented certain difficulties and have not been found entirely satisfactory. A primary problem in such prior devices has been their relative insensitivity to actuating forces as compared to known electromechanical transducers which operate by electromagnetic induction or in accordance with piezoelectric effects. Thus, for example, microphones using semiconductive components have heretofore been relatively insensitive as compared do dynamic microphones or crystal microphones. Moreover, many prior electromechanical transducers, such as microphones, which used semiconductive active components are not reproducible with similar characteristics.

Electromechanical transducers having semiconductive components do, however, have certain desirable characteristics. Such transducers are usually exteremely rugged and adaptable to miniaturization. It is therefore desirable to provide improved electrical devices which are used as electromechanical transducers, motion responsive devices and the like which use semiconductive active components and which, nevertheless, are extremely sensitive to motion, pressure, and ambient forces.

It has been discovered that a solid state active component, which has become known in the art as a "tunnel diode," can be made which exhibits sensitivity stresses applied thereto.

Tunnel diodes are semiconductive devices having thin or abrupt rectifying junctions. The term rectifying junction as used herein is intended to define any asymmetrically conductive barrier which transmits current more readily in one direction than in an opposite direction. The semiconductive materials which constitute tunnel diodes having relatively high free charge carrier (electron or hole) concentrations as compared to materials which have been conventionally used to make semiconductor junction diodes, such as have been used in prior electromechanical transducers as active elements. Semiconductive material with such relatively high free charge carry concentrations are termed degenerate. Degenerate semiconductive materials have semiconductive properties but their properties are almost the properties of a metal. For example, conventional semiconductive materials have resistivity in the order of one ohm-centimeter. Degenerate semiconductive materials of the type which are suitable for use in a tunnel diode have resistivities of about $10^{-3}$ ohm-centimeter. By way of comparison, a metal has resistivity in the order of $10^{-5}$ ohm-centimeter.

In semiconductive materials constituting tunnel diodes which are suitable for use in accordance with the present invention, the Fermi level on one side of the diode junction, (the P-side, for example) is in or adjacent to the valence band. The Fermi level on the other side of the junction (the N-side for example) is in the conduction band. The terms calence band, conduction band and Fermi level are used herein in the sense which is conventional according to quantum theory as applied in the semiconductor art (see, for example the text "Electrons and Holes in Semiconductors," by William Shockley, D. Van Nostrand and Company, Inc., New York, 1950).

In accordance with present theories, the tunnel diode conducts current in the forward direction by quantum mechanical tunneling, through the depletion region of its junction. A second characteristic of the tunnel diode is that it usually exhibits a negative resistance when biased in the forward direction by small voltages. A more detailed discussion of the tunnel diode appears in an article by H. S. Sommers, Jr. in Proceedings of the I.R.E., July, 1959, pages 1202–1206.

It is an object of the present invention to provide improved electrical devices which are sensitive to motion and dynamic forces.

It is a further object of the present invention to provide improved devices using semiconductive components which are operative as electromechanical transducers, such as microphones, phonograph record pickups, and the like.

It is a further object of the present invention to provide improved circuitry for operating electromechanical transducers and motion responsive devices using tunnel diodes.

It is a still further object of the present invention to provide a microphone incorporating a tunnel diode which is extremely sensitive to acoustic energy.

It is a still further object of the present invention to provide an improved microphone using a tunnel diode which is extremely sensitive to sound pressure and which is also extremely rugged.

It is a still further object of the present invention to provide a microphone using a tunnel diode as an active element which is adapted to miniaturization.

In accordance with the invention, an electrical device is provided which is responsive to dynamic actuation such as the motion of the ambient. This device includes components such as a tunnel diode, having the characteristic of being extremely sensitive to variations in stress applied to its junction. A member which is responsive to the motion of the ambient is mechanically coupled to the diode. When the member moves, forces are applied by the mecahnical coupling to the diode. These forces then stress the junction in the diode. Electrical circuits may be associated with the diode for providing an output signal which varies in accordance with the motion of the member. The member which applied force to the diode may be a vibratile member. A microphone may be provided in accordance with the invention including a diaphragm which is mechanically coupled to the diode for applying stresses to the diode junction in response to sound pressure. Various circuits may be associated with the device to provide transducing systems in accordance with the invention. For example, circuit means may be operatively connected to the tunnel diode of the device for generating oscillations modulated in amplitude and/or frequency in accordance with the motion, pressure or force applied to the device.

The invention itself, both as to its organization and method of operation, as well as the foregoing and other objects and advantages thereof, will become more apparent from a reading of the following description in connection with the accompanying drawings in which.

Figures 1, 3, 4, 5:
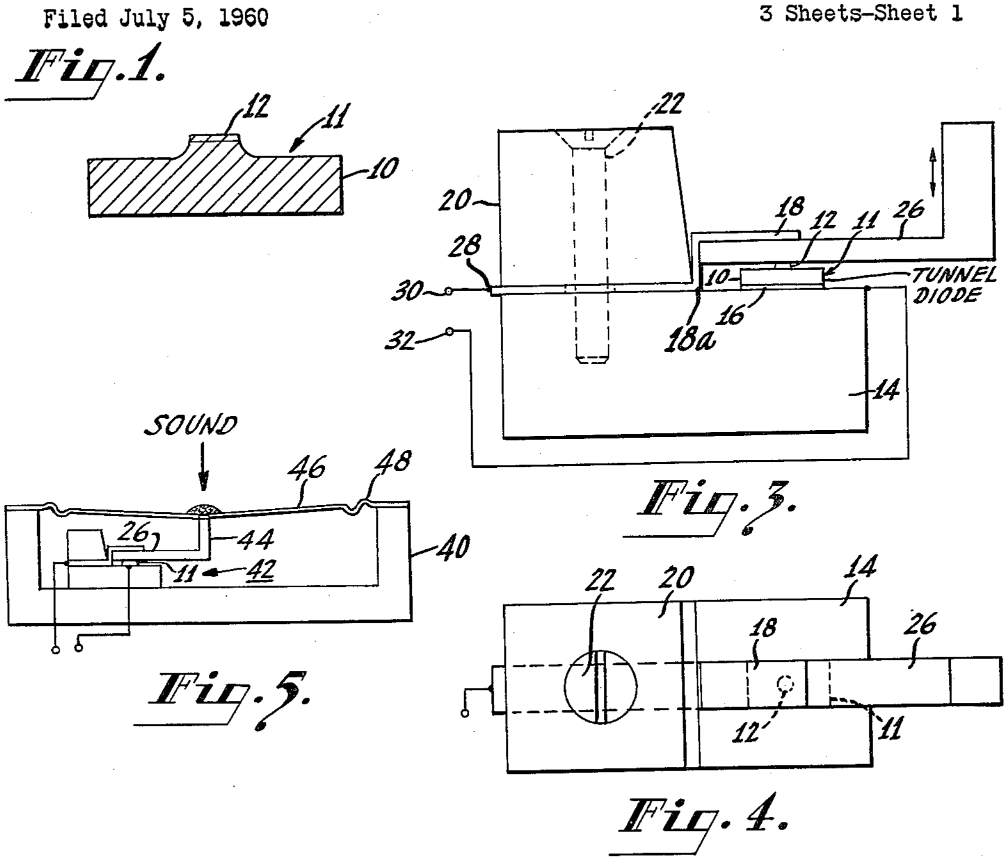
FIGURE 1 is a section-view of a tunnel diode which is suitable for use in devices and systems provided in accordance with the present invention.
FIGURE 3 is a front view of an electromechanical transducer provided in accordance with the present invention.
FIGURE 4 is a top view of the electromechanical transducer shown in FIG. 3.
FIGURE 5 is a sectional front view of a microphone provided in accordance with the present invention.

Referring now more particularly to FIG. 1 of the drawings, a tunnel diode 11 which is especially suitable for use in a device provided in accordance with the invention, in shown. This diode includes a body of semconductive material 10 and a layer 12 also of semiconductive material. The semiconductive material of the body and of the layer is doped (contains conductivity-type-determining impurities) to provide a very high concentration of free charge carriers. The material of the body and the material of the layer are therefore degenerate. The layer 12 and the body 10 may be very small. The body 10 may be about one millimeter long, one millimeter wide and one-quarter to one-half millimeter thick. The layer 12 may be a dot approximately one mil (0.001 inch) in diameter. The thickness of the layer 12 is desirably less than one-half mil as will be explained in detail hereinafter. The layer 12 is the upper part of a projection called a "mesa" in the art. The lower part of the mesa is constituted of the material of the body 10. The layer 12 is disposed on the surface of the body 10 and in operative relationship therewith. The layer 12 and the body 10 form an asymmetrically conductive barrier therebetween which transmits current more readily in a forward direction than in a reverse direction and which is called a rectifying junction. The junction is desirably a thin or abrupt junction as compared to junctions in conventional junction diodes. For example, the junction in the illustrated tunnel diode may be less than 200 angstroms thick.

In tunnel diodes which have been found especially suitable for use in accordance with the present invention, the position of the rectifying junction is close to the outer surface of the layer 12. The outer surface of the layer 12 is desirably less than 0.5 mil (a mil is a thousandth of an inch) from the position of the junction. A distance from the outer surface of the layer 12 to the junction of less than 0.2 mil or, from 0.1 to 0.2 mil, has been found to be especially suitable since the diode then is extremely sensitive to forces or pressures applied to the surface of the layer 12 and, consequently, applied to the junction.

Considering the materials of the body 10 and the layer 12 more specifically, these materials may be of opposite conductivity type. For example, the body 10 may be N-type material and the layer 12 may be P-type material. A P–N junction is then present between the layer 12 and the body 10. The material of the body and the material of the layer are degenerate and have a much higher concentration of free charge carriers than the materials ordinarily used in semiconductive diodes and transistors at the present time.

Figures 11, 13:
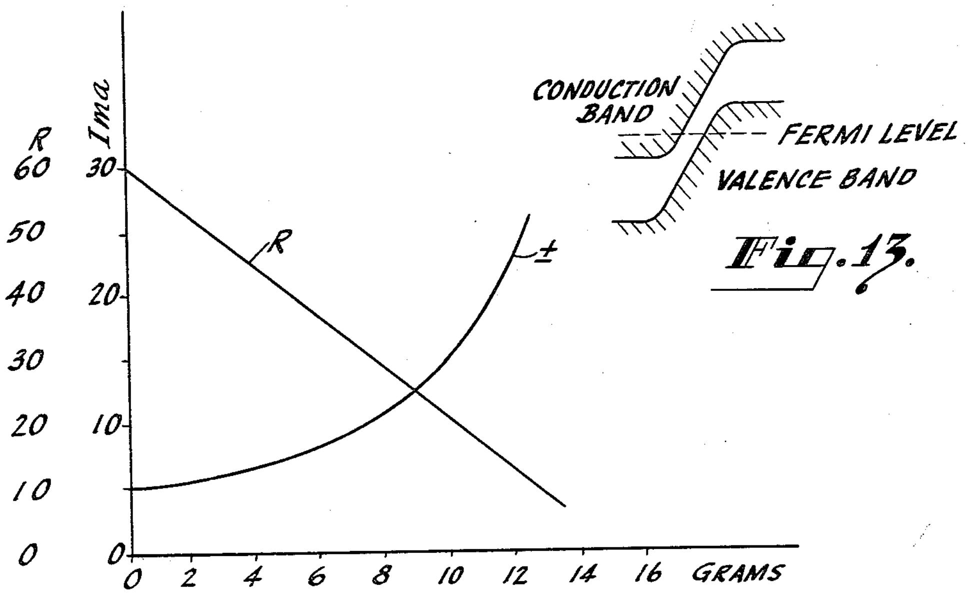
FIGURE 11 is a graph showing the characteristic of the system illustrated in FIGURE 10.
FIGURE 13 is an energy level diagram of the energy levels in a tunnel diode of the type shown in FIG. 1.

Referring to FIG. 13, an energy level diagram for a tunnel diode shown in FIG. 1, constituted of N and P type materials. This diagram is drawn in accordance with present understanding of the quantum theory of solids. It will be understood, however, that the diagram of FIG. 13 and the theory in accordance with which it is drawn, are used herein solely for purposes of facilitating the description and does not imply adherence to any particular theory. There is a copious supply of free charge carriers (donors, e.g., electrons) in the N-type material and a similarly copious supply of free charge carriers (acceptors, e.g., holes) in the P-type material. Accordingly the Fermi level is in the conduction band of the N-type material and in the valence band of the P-type material. The diagram of FIG. 13 shows the conditions at normal temperatures without applied bias voltages. When the diode is biased at small voltages in the forward direction, the forward current reaches a maximum and then decreases with increased applied voltages to provide a range of applied voltages within which the diode will exhibit a negative resistance.

The current through the junction is attributed to the tunneling of the majority charge carriers through the depletion region between the N- and P-type semiconductive materials. This current has been found to be variable in accordance with stresses applied to the junction and, particularly, in accordance with force or pressure applied to the junction through an extremely thin layer of opposite conductivity type material, such as the layer 12 shown in FIG. 1. This increased conduction can also be expressed in terms of increased conductivity or decreased resistance with increased force, stress, or pressure. The mechanism in accordance with the quantum theory of solids, to which the extreme sensitivity of a device provided in accordance with the invention can be attributed is not fully understood at present. However, a device provided as just described has a very high sensitivity to pressure and other stress forces, and higher than those which operate in accordance with the so called piezo-resistance effect. The following examples are presented to illustrate how diodes such as the one shown in FIG. 1, which are suitable for use in accordance with the invention, may be fabricated.

*Example (1)*.—A single crystal bar of N-type germanium is doped with arsenic to have a donor concentration between $1 \times 10^{19}$ and $4 \times 10^{19}$ per cubic centimeter by methods conventional to the semiconductor art. This may be accomplished, for example, by pulling a seed crystal from molten germanium containing the requisite concentration of arsenic. A wafer is cut from the bar along the (111) plane of the crystal (a plane perpendicular to the (III) crystallographic axis of the crystal). The wafer constitutes the body 10.

A P-type layer is then grown on the surface of the wafer. The technique for growing the P-type layer is described in detail in a patent application filed in the name of Herbert Nelson, Serial No. 843,186 on September 29, 1959, and assigned to the assignee of this application. More particularly, in accordance with this technique, a charge consisting of one percent by weight of gallium and the remainder indium, the charge being saturated with germanium at a temperature of 550° C. to 600° C. constituting the melt used is placed at one end of a boat. The wafer is placed at the other end of the boat. The boat is a container made of graphite or the like. The boat containing the wafer and the melt is placed in an oven at a temperature of 500° C. to 520° C. At this tmeperature, the melt is molten, but the germanium wafer is solid. The boat is then tipped so that the melt can flow over the exposed face of the wafer. When the boat is tipped, the temperature of the oven is raised 10° C. to 15° C. The germanium is soluble in the melt. A dissolving process occurs at the interface between the material of the wafer and the material of the melt. Next the melt and the wafer are cooled to a temperature of 400° C. to 450° C. at which a portion of the dissolved wafer and the melt precipitates and recrystallizes on the exposed wafer face. The boat is then tipped back and the remainder of the melt is decanted. In the process of recrystallization, an abrupt P–N junction is formed at some distance below the outer recrystallized surface.

The wafer is then cleaned to remove all traces of the melt by immersion in a solution of hydrochloric acid. A layer of P-type material remains on this surface. The layer of P-type material is lapped, as by grinding until it is very thin. For example, the layer may be desirably less than 0.2 mils thick. Small areas of the layer are masked after lapping with small segments of lead, for example. A conventional etch solution is then applied to the surface of the layer to remove the layer except for the mask areas. Mesas are then left on the surface of the wafer body. The etch solution may be a solution of nitric hydrofluoric and acetic acids. The solution may also contain potassium iodide as a catalyst.

*Example* (*2*).—A wafer of P-type germanium is provided by doping a single crystal bar with gallium to have an acceptor concentration of between $1\times10^{19}$ and $4\times10^{20}$ per cubic centimenter. A wafer may be cut from the bar as set forth in Example 1. The wafer is then placed in a boat, such as described in Example 1, together with a melt made before the wafer is placed in the boat and consisting of one percent to eight percent by weight of arsenic and the remainder 60–40 (lead-tin) solder saturated with germanium at a temperature of 500° C. to 550° C. The boat containing the wafer and the melt are disposed in an oven heated to 400° C. to 420° C. The boat is tipped to flood the exposed face of the wafer with the melt so as to dissolve a portion of the wafer. When the boat is tipped, the temperature of the oven is raised 10° C. to 15° C. The melt and the wafer are then cooled to a temperature at which a portion of the dissolved wafer and the melt precipitate and recrystallizes on the exposed wafer face. The remainder of the melt is then decanted by tipping the boat in the reverse direction. The wafer is then cleaned (by immersion in a solution of hydrochloric acid), masked, and etched to form mesas including layers of N-type material. Finally, the tops of the mesas are very lightly lapped with fine abrasive. The final thickness of the N-type layer or mesa can be less than 0.1 mils.

*Example* (*3*).—A wafer of P-type germanium and a layer of N-type germanium is formed in accordance with the steps outlined in Example 2. However, a more concentrated etch solution is used. Alternatively the etch solution is applied for a longer period of time until the thickness of the mesa is the small desired thickness.

*Example* (*4*).—A single crystal bar of N-type germanium is doped with arsenic to have a donor concentration of from $1\times10^{19}$ to $1.5\times10^{19}$ per cubic centimeter. A wafer is cut from the bar as explained in Example 1. A melt of 50 grams of indium and 0.25 gram of gallium, the melt being saturated with germanium at a temperature of about 450° C. is made. The wafer is placed in one-half of a partitioned boat with one face of the wafer exposed. A melt including 50 grams of indium and 0.25 gram of gallium saturated with germanium at a temperature of 450° C. is placed in the other half of the boat. The boat is then placed in an oven heated to a temperature of 450° C. The melt is molten at this temperature but the wafer remains solid. The boat is then tipped so that the melt flows over, and floods the exposed face of the wafer. When the boat is tipped the oven temperature may be raised about 10° C. After a suitable time, the boat is tipped back and the excess melt is decanted. The crystal is then allowed to cool. In cooling, the crystallization of a layer of P-type material takes place on the exposed face of the wafer. In the process of crystallizing, an abrupt P-N junction is formed below the outer surface of the layer. The wafer is then cleaned. The wafer is finally lapped to remove portions of the "grown" layer and to leave mesas which may be approximately 1 mil in diameter. The tops of the mesas may be lapped so that the position of the junction is within 0.1 to 0.2 mil from the outer surface of the mesa. The wafer may then be sliced by grinding or sawing into 1⁄16" squares, each containing one mesa in the center thereof.

Referring to FIGS. 3 and 4, there is shown an electromechanical transducer which may be provided in accordance with the present invention. The transducer illustrated in FIGS. 3 and 4 may, for example, be approximately ⅜" long and ¼" wide and ⅜" maximum height. The drawings are to an enlarged scale in order to illustrate the features of the transducer.

The transducer includes a base or support 14 of insulating material. The tunnel diode 11 is disposed on this support. The support may be made of insulating material. A sheet 16 of conductive material is sandwiched between the bottom of the body 10 of the tunnel diode and the surface of the support 14. A Z-shaped bracket 18 is mounted on the support 14 by means of a clamping block 20. The block has a sloping side adjacent the bracket 18. A bolt 22 extends through both the clamping block 20 and a hole 24 in the bracket 18 and into a threaded hole in the support 14. The bolt 22 clamps the bracket 18 to the support 14. The bracket 18 is desirably made of yieldable conductive material, such as a copper alloy. An L-shaped arm 26 is attached, both mechanically and electrically, as by being soldered, to the bracket 18 near one end of its upper surface. The lower surface of the arm 26, near the end thereof which is soldered to the bracket 18, rests on and bears against the mesa 12 of the tunnel diode 11. The arm 26 may be made of brass, for example. The arm 26 is disposed in ohmic contact with the layer 12 of the tunnel diode 11. The terminal 28 may be connected to an extension of the bracket 18 which projects past the support 14. A lead wire 30 or other electrical connecting means may be connected to the terminal 28.

Assuming that the layer 12 is of degenerative P-type material and the body 10 is of the degenerate N-type material, the arm 26 and the bracket 18 provide an anode or emitter electrode for the tunnel diode as well as a terminal of the device. Similarly, the sheet of conductive material 16 provides a cathode or base electrode for the tunnel diode. Another lead wire 32 may be connected to the sheet 16.

The arm 26 constitutes a lever pivotally mounted by the bracket 18 on the support 14, since the bracket 18 is yieldable, and acts as a hinge with a pivot around the corner 18*a*. The arm 26 may vibrate in response to ambient motion or to pressure applied thereto. Consequently the arm 26 constitutes a vibratile member for applying forces to the mesa 12 of the tunnel diode 11 and, consequently, to the junction of the diode. The tunnel diode 11 is extremely sensitive to such forces. The sensitivity of the tunnel diode is reflected in changes to its electrical characteristics. Since the forces are, or may be applied to the upwardly extending leg of the L-shaped arm 26 as indicated by the arrow in the drawing adjacent thereto, the mesa 12 of the tunnel diode is disposed closer to the bracket 18 than to the upstanding leg of the arm 26. Since the arm is a lever, the forces applied to the upstanding leg thereof are amplified by the mechanical advantage of the lever. This mechanical advantage is equal to the ratio to the length of the arm to the distance between the mesa 12 and the upper portion of the bracket 18. A suitable mechanical advantage may, for example, be 10 to 1 so that the length of the arm 26 may be ten times the distance between the mesa 12 and the portion of the bracket 18 which is perpendicular to the support 14.

Figure 2:
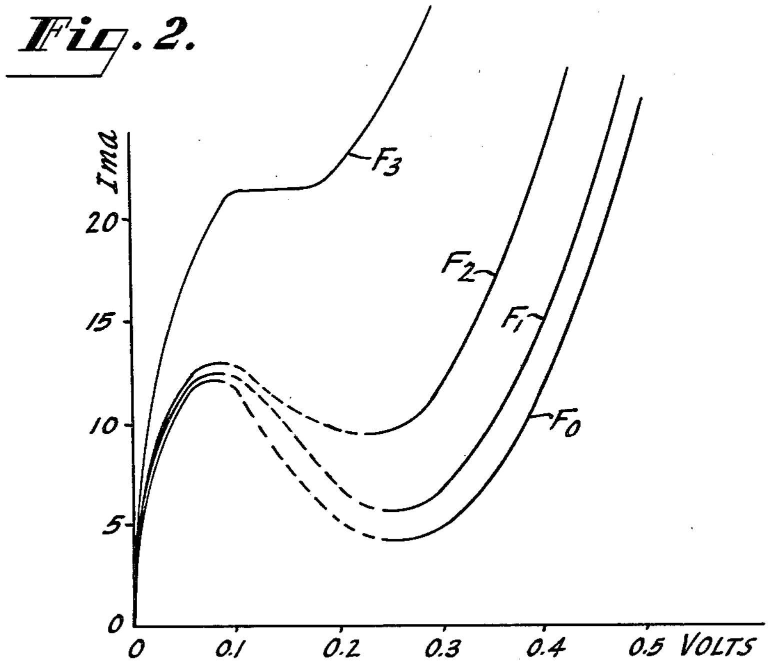
FIGURE 2 is a graph showing the current-voltage characteristics of a tunnel diode of the type shown in FIG. 1.

The electrical characteristics of the transducer shown in FIGS. 3 and 4 are illustrated in FIG. 2. The current voltage characteristics of the tunnel diode are represented. The graph is calibrated with specific values of voltage and current solely in order to aid in the description. It will be appreciated that these values will be different for different types of tunnel diodes. Four different curves are shown. The curves are labeled $F_0$, $F_1$, $F_2$, $F_3$. The curves $F_0$, $F_1$, $F_2$, and $F_3$ represent, respectively the electrical characteristics of the diode with progressively greater magnitudes of forces applied to the lever arm 26. It will be observed that the resistance exhibited by the diode which is represented, by the slope of the curve at any point, is positive in the region of applied voltages from zero volts to about 0.1 volt. The curves $F_0$, $F_1$, and $F_2$ all show that the diode exhibits a negative resistance with applied voltages in the forward direction in the range from about 0.1 volt to about 0.3 volt. The curve $F_3$, however, shows that the diode does not exhibit a negative resistance in the last mentioned range. The portion of the curves $F_0$, $F_1$, $F_2$ during which a negative resistance is exhibited are shown by the dash lines. For applied voltage greater than about .3 volt the resistance exhibited by the diode is again positive.

It will be observed from the curves that for the same applied voltage the current through the diode from lead wire 30 to the lead wire 32 (see FIG. 3) increases with force applied to the arm 26. The curve $F_0$ may, for example, be taken with no force applied to the lever 26. The curve $F_1$ may be taken with approximately 40 grams of applied force, the curve $F_2$ may be taken with approximately 80 grams of applied force, and $F_3$ may be taken with approximately 125 grams of applied force.

When biased at greater than about 0.1 volt the device including the tunnel diode exhibits a change in current therethrough which is proportional to the change in the force applied thereto. This change in current will be observed, for example, to be from about 6 ma. to 10 ma. when the force increases from 40 grams to 80 grams. This apparently is an appreciable current change. In known electromechanical transducers including active semiconductive elements, a current change of such magnitude is not possible. For the same variation and applied force in the case of a known device, a change in current is less by a factor of about 10 than is the case of a device provided in accordance with the present invention. The effect of changes in applied force or stress on the tunnel diode is not completely understandable at the present time. However, the results of the effects are most significant when utilized in accordance with the present invention.

FIG. 5 shows a microphone which is provided in accordance with the present invention. The microphone has a cup shaped case 40. An electromechanical transducer device 42 similar to the device shown in FIG. 3 is mounted at the bottom of the case 40. Upstanding leg 44 of the arm 26 of the transducer device 42 extends toward the open end of the case 40. A diaphragm 46 of conical shape is suspended across the open end of the case 40. This diaphragm includes a corrugate suspension portion 48 which may be glued or otherwise secured to the edge of the case 42. The diaphragm has an opening at its apex. The upstanding leg 44 of the arm 26 projects through this opening.

In constructing the microphone, a predetermined force is applied to the arm 26. While this force is applied to the arm 26, the diaphragm 44 is glued or otherwise firmly attached to the arm 26. When the glue sets the diaphragm continues to apply a biasing force against the arm 26 and consequently against the diode 11 of the device 42. Vibration of the diaphragm in response to sound pressure, causes this biasing force to vary by increasing or decreasing the force on the diode. More particularly, the diaphragm will move in a direction inwardly or outwardly of the case 40. The force applied to the arm 26 will therefore vary about the initial biasing force. Accordingly, the electrical characteristics of the tunnel diode and the device 42 will vary in accordance with sound pressure.

Figure 6:
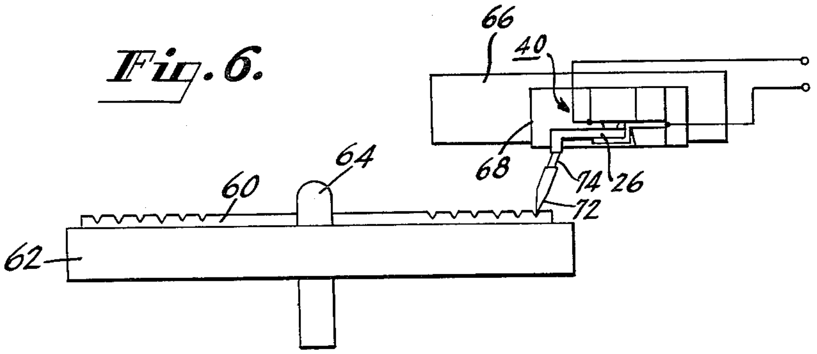
FIGURE 6 is a schematic representation of a phonograph record pickup provided in accordance with the present invention which is shown operatively associated with a phonograph record.

FIG. 6 shows a phonograph pickup arrangement. A grooved phonograph record 60 is disposed on a turntable. The turntable has a spindle 64. The turntable 62 may be driven in any manner conventional in the art. A phonograph tone arm 66 has an opening 68 therein. An electromechanical transducer 70 similar to the transducer shown in FIGS. 3 and 4 is mounted on the arm. This transducer 70 includes a lever arm 26 which is connected to a needle 72 which tracks in the grooves 60. The needle 72 is, or may be, coupled to the arm 26 by a link 74 which converts the lateral motion of the needle into longitudinal motion for actuating the arm 26. Alternatively, the transducer may be mounted on its side so as to respond directly to lateral movement of the needle 72.

Figure 7:
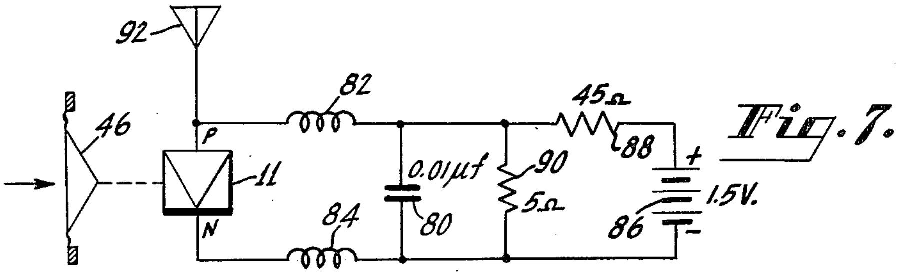
FIGURE 7 is a schematic diagram of a microphone system provided in accordance with one embodiment of the invention which is operative as a wireless transmitter.

FIG. 7 illustrates a microphone system provided in accordance with the present invention. A microphone, for example, as illustrated in FIG. 5 may be used. This microphone includes a diaphram 46 which is mechanically coupled to a tunnel diode 11 for the purpose of applying varying stresses to the junction of the diode. While a microphone is illustrated herein, it will be appreciated that the circuitry shown in FIG. 7 may be associated with any electrical device responsive to motion pressure or stress which includes a stress sensitive tunnel diode. For example, a tunnel diode phonograph pickup such as illustrated in FIG. 6 may be included in the circuitry shown in FIG. 7.

A resonant circuit is connected across the tunnel diode. This resonant circuit may include the inductance which is inherent in the leads connected to the diode 11.

This inductance is illustrated in the drawing by the inductors 82 and 84. The resonant frequency of the resonant circuit is determined by the interval capacitance of the tunnel diode 11 and the inductance of the inductors 82 and 84. A source of voltage such as a battery 86 is connected to a voltage divider comprising a pair of resistors 88 and 90. The resistor 90 is connected across the diode 11. An R.F. (radio frequency) bypass capacitor 80 is connected across the resistor 90. The voltage across the resistor 90 biases the diode 11 in the forward direction so that the diode exhibits a negative resistance. In order not to overcome the negative resistance exhibited by the diode 11, the absolute value of the resistance presented in the circuit by the resistors 88 and 90 should be less than that of the resistance exhibited by the diode. Suitable values of capacitor and resistor and voltage are indicated in the circuit solely for purposes of illustration. An antenna 92, is connected to the tunnel diode.

Since the diode presents a negative resistance, the resonant circuit and the diode constitute an oscillation genertaor which produce oscillations. As pointed out in the above referenced article by H. S. Sommers, Jr., the tunnel diode presents a resistance and capacitance in parallel with each other. In operation both the resistance and capacitance presented by the tunnel diode vary in accordance with applied sound pressure. Accordingly, both the amplitude and frequency of the oscillations produced by the oscillation generator are modulated in accordance with the sound pressure applied to the diaphram 46. In practice it has been found that when the illustrated circuit propagates oscillations at a frequency of twenty-one megacycles per second (mc.), the frequency of these oscillations can vary approximately 20 kilocycles per second (kc.) with normal sound pressures. (As would be produced by usual speaking voices at conversational distances.) A radio receiver which is operative to receive radio frequency signals may be tuned to the frequency of the oscillations generated by the circuit illustrated in FIG. 7. The oscillations are radiated by the antenna 92 to the radio receiver. The radio receiver operates in a conventional manner to detect the sound applied to the microphone. The receiver may include a conventional amplitude modulation detector or a conventional frequency modulation detector. In either case, the receiver output will correspond to the sound spoken into microphone diaphragm 46.

Figure 8:
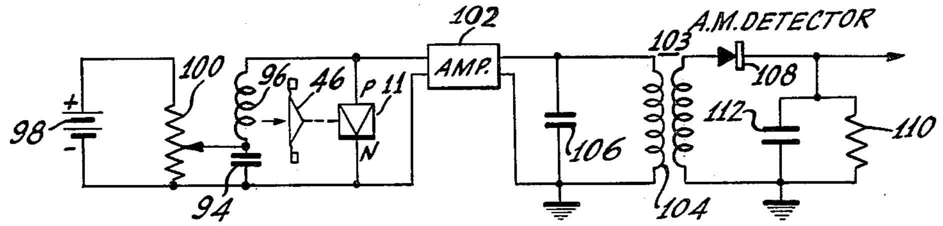
FIGURE 8 is a schematic diagram of a microphone system provided in accordance with another embodiment of the present invention which contains an amplitude modulation detector.

FIG. 8 shows a microphone system which provides an audio output, rather than a radio frequency output, corresponding to applied sound energy. While a microphone system is illustrated, the circuitry shown in FIG. 8 may be used together with any electrical device responsive to motion, pressure or stress which includes a stress sensitive tunnel diode.

The illustrated microphone may be similar to the microphone in FIG. 5 and includes a diaphragm 46 mechanically coupled to a tunnel diode 11 so as to be capable of applying stress to the junction thereof. An oscillation generator including the tunnel diode 11 is provided. This circuit includes a resonant circuit provided by an inductor 96. The inductor 96 may be provided by the inherent inductance of the leads connected to the tunnel diode 11. A biasing circuit including a battery 98 and a potentiometer 100 is also provided. An R.F. bypass capacitor 94 is also connected across the part of the potentiometer 100 in the R.F. current path of the circuit.

The arm of the potentiometer 100 is connected, through the inductor 96, to the emitter of the tunnel diode 11. The negatively polarized end of the potentiometer is connected to the collector of the tunnel diode. The voltage provided by the potentiometer biases the tunnel diode in its forward direction so that the tunnel diode exhibits a negative resistance.

The tunnel diode 11 and the resonant circuit provides oscillations at a frequency determined by the resonant frequency of the resonant circuit.

The output of the oscillation generator is applied to an amplifier 102. The output of the amplifier is coupled to an amplitude modulation detector 103. The amplifier 102 may be of the cathode follower type or, in the event that a transistor amplifier is used, it may be of the emitter follower type. The purpose of the amplifier is primarily to prevent the detector from overloading the oscillator generator. The amplifier 102 may include one or more stages of amplification, if desired.

The amplitude moduation detector includes a radio frequency coupling transformer 104. The primary of this transformer is tuned by means of a capacitor 106 to the frequency of oscillation of the oscillation generator. A diode 108 is connected to a resistor 110 and a capacitor 112 which are in parallel. The diode, resistor and capacitor are connected across the secondary of the transformer 104. The output of the detector may be derived across the resistor 110 and may be applied to an audio frequency amplifier for amplification. The oscillation generator, amplifier 102 and detector 103 may be mounted as a unitary structure in the same container. The output of the detector may be coupled to a microphone cable as would be the case with the output of any conventional microphone. The amplitude modulation detector is conventional and operates in a conventional manner. Accordingly, its operation will not be described in detail herein.

Figure 9:
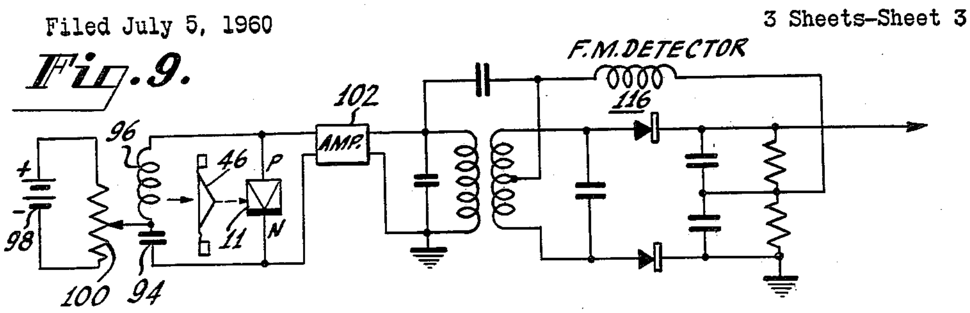
FIGURE 9 is a schematic diagram of a microphone system provided in accordance with still another embodiment of the present invention which includes a frequency modulation detector.

FIG. 9 shows a microphone system which is similar to the microphone system shown in FIG. 8. Accordingly, like reference numerals are used to identify like parts in the systems represented in FIGS. 8 and 9. The output of the amplifier 102 in the system of FIG. 9 is connected to a frequency modulation detector 116. Such a frequency modulation detector is known and is described in the text, "Electric Circuits and Tubes," McGraw-Hill Company, New York, 1947, p. 714. Accordingly, the F.M. detector will not be described in detail herein. The output of the F.M. detector may be connected to a microphone cable as was the case with the output of the amplitude modulation detector 103 as shown in FIG. 8.

In operation, the frequency of oscillation of the oscillation generator including the resonant circuit and the tunnel diode 11 varies in frequency in accordance with sound pressure applied to the diaphragm 46, as was the case of the oscillator discussed in connection with FIG. 7 of the drawings. These oscillations are amplified in the amplifier 102 and demodulated in the F.M. detector 116. The output of the detector 116 is an audio signal corresponding to the sound applied to the diaphragm 46. The circuitry shown in FIG. 9 may be packaged in a single case. The microphone system shown in FIGS. 8 and 9 are both well adapted to miniaturization since the tunnel diode transducer may be made very small, as was pointed out above, and since the circuitry associated therewith is adapted to miniaturization in accordance with techniques which are now known. The entire microphone system may be, thus packaged in a very small space.

Figure 10:
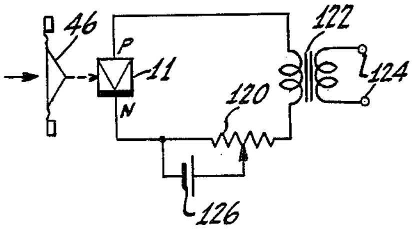
FIGURE 10 is a schematic diagram of a microphone system provided in accordance with still another embodiment of the present invention which uses the tunnel diode in a positive resistance region of its characteristic.

FIG. 10 shows another microphone system provided in accordance with the present invention. Although a microphone system is illustrated, it will be appreciated that the circuitry shown in FIG. 10 may be associated with any electromechanical transducer or stress responsive device utilizing a tunnel diode. In the illustrated circuit, the microphone may be similar to the microphone shown in FIG. 5 and may include a diaphragm 46 mechanically coupled to a tunnel diode 11. The tunnel diode 11 is connected in series with a potentiometer 120 and the primary of an output transformer 122. The secondary of the output transformer has a pair of output terminals 124. A voltage source illustrated as a battery 126 is connected between the arm and one side of the potentiometer 120. The voltage across the potentiometer is adjusted by varying the position of the arm of the potentiometer 120 so that the tunnel diode 11 is biased in the forward direction somewhat beyond the region of its characteristics wherein it exhibits a negative resistance.

The operation of the circuit shown in FIG. 10, will be better understood by consideration of the curves shown in FIG. 11. FIG. 11 includes two curves labeled I and R, respectively. The curve labeled I represents the variation in current flow through the tunnel diode 11 with a variation in force applied to the lever arm 44 of the microphone. The curves are calibrated for purposes of the description. It will be appreciated that this calibration may be different for different types of tunnel diodes. For example, calibration may be different for a tunnel diode constituted of different semiconductive materials. A tunnel diode exhibiting the characteristic represented in FIG. 11 may be made in accordance with the procedure set forth in Example 4. The curves are taken with the diode biased in the forward direction with a voltage of 0.3 volt.

It will be observed that the current flowing through the tunnel diode increases with increasing sound pressure and the resistance of the diode decreases with increasing sound pressure.

It will be observed that the resistance variation is substantially linear. Accordingly, the output of the microphone will be directly proportional to the applied sound pressure. It will therefore, be appreciated that the frequency response of the microphone will be limited only by the acoustic properties of the microphone system rather than by the electrical properties of the tunnel diode transducer.

As the sound pressure varies, the current flowing through the primary of the transformer 122 will vary correspondingly in a major degree. The current variation will, therefore, correspond to the sound pressure applied to the microphone diaphragm 46. The terminals 124 may be connected to a microphone cable or may be coupled to the input of an amplifier for further audio amplification.

Figure 12:
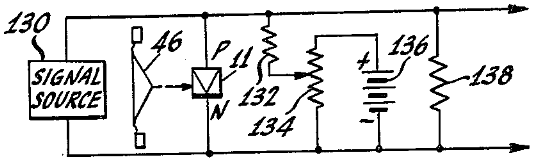
FIGURE 12 is a schematic diagram showing still another embodiment of a microphone system provided in accordance with the present invention utilizing a tunnel diode as a sound pickup and as an amplifier in the same unit.

Referring to FIG. 12 of the drawings, a microphone system is provided utilizing a tunnel diode amplifier circuit. A signal source 130 is included which may provide oscillations of a single frequency. This signal source is connected to the input of an audio amplifier including the tunnel diode 11 of the tunnel diode microphone. This microphone may be similar to the microphone shown in FIG. 5. While a microphone system is disclosed, it will be appreciated that the amplifier circuitry may be used in any motion, force or pressure sensitive device including a tunnel diode. The tunnel diode microphone includes a diaphragm 46 responsive to sound pressure. The diaphragm 46 is mechanically coupled to the diode 11 for applying variable stresses corresponding to sound pressure to the junction of the diode 11. A biasing circuit is connected across the diode 11. This circuit includes a resistance 132 connected to an arm of the potentiometer 134. A battery 136 is connected across the potentiometer. This battery is polarized to provide a voltage which biases the diode 11 in the forward direction, so that the diode 11 exhibits a negative resistance. A load resistor 138 is also connected across the diode 11. The output of the microphone system may be derived across the load resistor 138.

In the amplifier circuit, the conductance presented by the source of biasing potential including the resistor 132, potentiometer 134 and battery 136 and the conductance presented by the load resistor 138 is made greater than the maximum negative conductance presented by the diode 11, in order to prevent oscillations in the circuit.

In operation the signal potentials from the source drive current through the diode in a direction to increase signal current through the load resistor by an amount proportional to the negative resistance presented by the diode. Since this negative resistance varies in accordance with the sound pressure applied to the diaphragm 46, as was explained here before, the signal current through the resistor 138 will vary in accordance with the sound pressure. In other words, the gain of the amplifier is modulated by the sound pressure applied to the diaphragm 46. The amplifier circuit shown in FIG. 12 is described in detail in application filed in the name of John B. Schultz, Serial No. 850,825, filed November 4, 1959 and assigned to the same assignee as that of the present application.

From the foregoing description, it will be apparent that there has been provided improved devices responsive to motion under the ambient subject for example, as microphones, phonograph pickup and various types of electromechanical transducers and circuits for operating same. Although only several exemplary system and devices in accordance with the present invention have been shown and described herein, various components and elements useful therefore, as well as variations in the system and devices themselves, all coming within the spirit of the invention, will, no doubt, readily suggest themselves to those skilled in the art. Hence, it is desired that the foregoing be considered illustrative and not in any limiting sense.

What is claimed is:

1. An electrical device comprising a tunnel diode having increasing conductivity with increasing stress applied to the junction thereof, and a vibratile member disposed for contacting said diode for applying vibratile forces to said junction.

2. An electrical device comprising a body of degenerate semiconductive material, a layer of degenerate semiconductive material disposed in operative relationship therewith to define an abrupt rectifying junction therebetween, and means coupled to said layer for applying vibratory forces against said junction.

3. An electrical device comprising a body of degenerate semiconductive material having a rectifying junction therein, electrodes connected to said body on opposite sides of said junction, and dynamically actuable means coupled to said body for applying stresses to said junction.

4. Electrical apparatus which comprises a circuit having an input and a signal output, a tunnel diode connected between said input and said output, a source of voltage connected to said input, and motion responsive means mechanically coupled to said diode for applying stress to the junction of said diode whereby to vary the signal at said output.

5. An electrical device which comprises a body of degenerate semiconductive material having an abrupt rectifying junction and exhibiting a negative resistance when biased by certain voltages in the forward direction, means for applying stresses to said junction, and means responsive to ambient motion for controlling said stress applying means.

6. The invention as set forth in claim 5 including circuit means connected to said body for applying bias voltages thereto, said circuit means including means for deriving output signals related to said stresses.

7. An electrical device comprising a body of degenerate semiconductive material of one conductivity type, a layer of degenerate semiconductive material of opposite conductivity type disposed on a surface of said body and defining with said body an abrupt P-N junction therebetween, said junction having an area smaller than the area of surface of said body, and a vibratile means in contacting relationship with said layer for applying stresses to said junction in response to motion of said vibratile means.

8. An electrical device comprising a tunnel diode including a body of degenerate semiconductive material, a layer of degenerate semiconductive material disposed on a surface of said body and defining therewith an abrupt rectifying junction, said layer having an outer surface spaced from said body surface, said junction being less than 0.0005 inch from said outer surface of said layer, and a vibratile member disposed to contact said outer surface for applying stresses to said junction in response to motion of said vibratile member.

9. The invention as set forth in claim 8 wherein the thickness of said layer is such that said outer surface of said layer and said junction are spaced from each other by a distance in the range of 0.0001 inch to 0.0002 inch.

10. The invention as set forth in claim 8 wherein the material of said body in N-type germanium and the material of said layer is P-type germanium, said materials of said body and said layer both having a free charge carrier concentration equal to or greater than $1 \times 10^{19}$ per cubic centimeters.

11. An electrical device comprising a tunnel diode having a body of degenerate semiconductive material and a layer of degenerate semiconductive material which define an abrupt rectifying junction therebetween current through which is due to tunnelling of charge carriers, a support, said body being disposed on said support, a lever arm pivotally mounted at one end thereof on said support, said arm being disposed in contact with said layer of said diode at a point intermediate its ends whereby movement of said arm will apply pressure to said layer for stressing said junction.

12. An electrical device which comprises a tunnel diode including a body of degenerate semiconductive material having inner and outer opposite surfaces and a layer of degenerate semiconductive material also having inner and outer opposite surfaces, said layer inner surface and said body inner surface being disposed in operative relationship and defining an abrupt rectifying junction therebetween, a support of insulating material, said body outer surface being disposed on said support, an electrode being sandwiched between said support and said body outer surface, said electrode being in ohmic contact with said body, a lever arm of conductive material disposed in ohmic contact with said layer outer surface, a bracket of flexible, conductive material disposed on said support and extending therefrom, and a block of insulating material clamping said bracket to said support, one end of said arm being disposed in contact with the extending portion of said bracket, said arm being pivotally movable with said bracket toward and away from said diode for applying forces against said layer thereby stressing said junction, said layer being disposed closer to said one pivoted end of said arm than to the opposite end thereof.

13. An electromechanical transducer comprising a tunnel diode including a body of degenerate semiconductive material and a layer of degenerate semiconductive material disposed in operative relation therewith to define an abrupt rectifying junction, a vibratile member disposed to contact said layer, and means mechanically coupled to said member for vibrating said member.

14. A microphone comprising a tunnel diode including a body of degenerate semiconductive material and a layer of degenerate semiconductive material disposed in operative relation therewith to define an abrupt rectifying junction, a diaphragm responsive to sound pressure, and means coupling said diaphragm to said layer for translating said pressure into forces against said layer.

15. A microphone comprising a tunnel diode having a rectifying junction and presenting electrical characteristics which vary in accordance with stresses applied to said junction, a lever arm, means mounting said arm pivotally and in contact with said diode, and a diaphragm coupled to said arm for forcing said arm against said diode to apply stresses to said junction in response to sound pressure.

16. An electrical device comprising a tunnel diode including a body of degenerate semiconductive material and a layer of degenerate semiconductive material disposed in operative relationship therewith to define an abrupt rectifying junction, a vibratile member disposed to contact said layer, and means biasing said member against said layer with a predetermined static force.

17. The invention as set forth in claim 16 wherein said member is an electrode disposed in ohmic contact with said layer.

18. A phonograph pickup adapted to cooperate with a grooved record which comprises a tunnel diode having a rectifying junction and presenting electrical characteristics which vary in accordance with stresses applied to said junction, and a vibratile member for tracking in the grooves of said record coupled to said diode for varying the stresses applied to said junction.

19. An oscillation generator comprising a tunnel diode having a rectifying junction, resonant circuit means connected to said tunnel diode, means connected to said diode for biasing said diode to exhibit a negative resistance, and a vibratile member mechanically coupled to said diode for applying variable stresses to said junction.

20. A microphone system which comprises a tunnel diode presenting a negative resistance characteristic when biased in the forward direction, said characteristic being variable in accordance with stresses applied to the junction of said diode, a resonant circuit connected to said diode, means for biasing said diode in said forward direction to exhibit said negative resistance characteristic, and a diaphragm mechanically coupled to vary the stresses exerted upon said junction in accordance with sound pressure.

21. An electrical system which comprises a tunnel diode having a rectifying junction and presenting a negative resistance when biased in the forward direction, an oscillation generator including said tunnel diode comprising a resonant circuit connected to said tunnel diode and means for biasing said diode in a forward direction to exhibit said negative resistance characteristic, a vibratile member mechanically coupled to said diode for applying variable stresses to said junction whereby to modulate the oscillations produced by said generator, and a demodulation circuit coupled to said oscillation generator.

22. The invention as set forth in claim 21 including an amplifier having an input and an output, said input being connected to said oscillation generator and said output being connected to said demodulator.

23. A microphone system which comprises a tunnel diode having a rectifying junction and presenting a negative resistance when biased in the forward direction, an oscillation generator including said tunnel diode which comprises a resonant circuit connected to said tunnel diode and circuit means connected to said diode biasing said diode in said forward direction to exhibit said negatve resistance characteristic, a diaphragm coupled to said tunnel diode for varying the stresses exerted upon said junction whereby to modulate the amplitude of the oscillations produced by said oscillation generator, and an amplitude modulation detector coupled to said amplifier for producing an audio signal in response to the modulated oscillation.

24. A microphone system which comprises a tunnel diode having a rectifying junction and presenting an electrical characteristic which varies in accordance with stresses applied to said junction, a diaphragm mechanically coupled to said diode to vary the stresses exerted upon said junction in response to sound pressure, an oscillation generator including said tunnel diode which comprises a resonant circuit connected to said tunnel diode and means for biasing said tunnel diode to exhibit a negative resistance, and a frequency modulation detector coupled to said amplifier for demodulating said oscillations to produce an audio signal in response to variations in frequency of said oscillations.

25. An electrical system which comprises a tunnel diode having a rectifying junction and presenting electrical characteristics which vary in accordance with the stresses applied to said junction, a vibratile member mechanically coupled to said junction for exerting variable pressure upon said junction, an oscillation generator including said tunnel diode which comprises a resonant circuit connected to said diode and means for biasing said diode to exhibit a negative resistance, and an antenna coupled to said oscillation generator for radiating signals produced by said generator.

26. The invention as set forth in claim 25 including a diaphragm responsive to sound pressure coupled to the vibratile member for actuating said member in response to sound pressure.

27. Electrical apparatus comprising a tunnel diode having a rectifying junction and presenting electrical conductivity, when biased in the forward direction, which varies in accordance with stresses applied to said junction, a vibratile member mechanically coupled to said diode for applying variable stresses to said junction, a power supply for biasing said diode in the forward direction and means responsive to variations in current through said diode.

28. An electrical apparatus which comprises a tunnel diode having a rectifying junction and presenting an electrical conductance which varies in accordance with stress applied to said junction, a vibratile member mechanically coupled to said diode for applying variable stresses to said junction, power supply means for biasing said diode in the forward direction and a transformer having a primary winding and a secondary winding, said power supply means, said transformer primary winding and said tunnel diode being connected in series with each other.

29. An electrical system which comprises a tunnel diode having a rectifying junction and exhibiting a negative resistance when biased in the forward direction which varies in accordance with stresses applied to said junction, a vibratile member mechanically coupled to said diode and operative to vary the stresses applied to said junction, an amplifier including said tunnel diode for biasing said diode in the forward direction, a load also connected across said tunnel diode, said load and said source having a total conductance greater than the maximum negative conductance of said diode, and means for applying a source of signals to said amplifier.

30. The invention as set forth in claim 29 including a diaphragm responsive to sound pressure coupled to said vibratile member for actuating said member.

31. In combination, an electrical device comprising a body of degenerate semiconductive material of one conductivity type, a layer of degenerate semiconductive material of opposite conductivity type disposed on a surface of said body and defining with said body an abrupt P-N junction therebetween, said junction having an area smaller than the area of surface of said body, a vibratile means in contacting relationship with said layer for applying stresses to said junction in response to motion of said vibratile means, means for applying a voltage across said body and said layer for biasing said junction in the forward direction, and circuit means also connected across said body and said layer providing signals which vary in accordance with the motion of said vibratile member.

References Cited in the file of this patent

UNITED STATES PATENTS

| | | |
|---|---|---|
| 2,410,982 | Koch | Nov. 12, 1946 |
| 2,469,579 | Ohl | May 10, 1949 |
| 2,488,927 | Owens | Nov. 22, 1949 |
| 2,549,550 | Wallace | Apr. 17, 1951 |
| 2,632,062 | Montgomery | Mar. 17, 1953 |
| 2,929,885 | Mueller | Mar. 22, 1960 |

OTHER REFERENCES

"Crystal-Tetrode Mixer," by R. W. Haegele, publication Electronics October 1949; pp. 80–81.

Bell Telephone System Technical, publication #3138, by A. Uhlir, Jr.; May 1958, or in the Proceeding of the I.R.E., vol. 46, pp. 1099–1115; June 1958; p. 17.

"Tunnel Diodes as High Frequency Devices," by Sommers, Jr., Proceeding of the I.R.E.; July 1959; 1202–1206.

"Tunnel Diode Big Impact," publication Electronics, Aug. 7, 1959, p. 61.